United States Patent
Araujo Da Silva et al.

(10) Patent No.: US 10,414,132 B2
(45) Date of Patent: Sep. 17, 2019

(54) ELASTOMERIC LAMINATE COMPRISING MORE THAN THREE LAYERS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: José-Carlos Araujo Da Silva, Clermont-Ferrand (FR); Xavier Deparis, Clermont-Ferrand (FR); Baptiste Foglieni, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 15/533,916

(22) PCT Filed: Nov. 23, 2015

(86) PCT No.: PCT/EP2015/077351
§ 371 (c)(1),
(2) Date: Jun. 7, 2017

(87) PCT Pub. No.: WO2016/091571
PCT Pub. Date: Jun. 16, 2016

(65) Prior Publication Data
US 2017/0326844 A1    Nov. 16, 2017

(30) Foreign Application Priority Data
Dec. 11, 2014 (FR) ..................... 14 62227

(51) Int. Cl.
| | | |
|---|---|---|
| B32B 25/00 | (2006.01) | |
| B32B 25/08 | (2006.01) | |
| B32B 25/16 | (2006.01) | |
| B32B 7/12 | (2006.01) | |
| B32B 25/14 | (2006.01) | |
| B60C 1/00 | (2006.01) | |

(52) U.S. Cl.
CPC ............... *B32B 25/16* (2013.01); *B32B 7/12* (2013.01); *B32B 25/14* (2013.01); *B60C 1/00* (2013.01); *B60C 1/0016* (2013.01); *B32B 2250/04* (2013.01); *B32B 2250/05* (2013.01); *B32B 2250/248* (2013.01); *B32B 2264/108* (2013.01); *B32B 2270/00* (2013.01); *B32B 2274/00* (2013.01); *B32B 2605/08* (2013.01)

(58) Field of Classification Search
CPC ......... B32B 25/00; B32B 25/08; B32B 25/12; B32B 25/14; B32B 25/16; B32B 7/12; B32B 2250/04; B32B 2250/24; B60C 1/0008; B60C 1/0016
See application file for complete search history.

(56) References Cited

U.S. PATENT DOCUMENTS

| | | | | |
|---|---|---|---|---|
| 4,089,360 | A | * 5/1978 | Bohm | ............... B29D 30/0005 152/505 |
| 4,450,252 | A | * 5/1984 | Fieldhouse | ............ C08G 14/06 524/353 |
| 4,601,935 | A | * 7/1986 | Metcalf | ................... B32B 25/02 428/57 |
| 8,689,846 | B2 | 4/2014 | Jones et al. | |
| 2009/0068476 | A1 | 3/2009 | Kirino | |

FOREIGN PATENT DOCUMENTS

| | | | | |
|---|---|---|---|---|
| EP | 1880871 A1 | 1/2008 | | |
| EP | 1940617 B1 | 3/2014 | | |
| JP | 61192552 A | * 8/1986 | ......... | G01N 27/4175 |
| JP | 5-338079 A | * 12/1993 | ............. | B32B 25/00 |

OTHER PUBLICATIONS

JP 5-338079 A (Dec. 21, 1993); machine translation. (Year: 1993).*
International Search Report for PCT/EP2015/077351 dated Jan. 20, 2016.

* cited by examiner

*Primary Examiner* — Rip A Lee
(74) *Attorney, Agent, or Firm* — Dickinson Wright PLLC

(57) ABSTRACT

An elastomeric laminate is provided. The elastomeric laminate comprises a layer A consisting of a diene rubber composition, a layer B comprising a highly unsaturated diene elastomer B, n layers Ci arranged between the layer A and the layer B, n being an integer ≥2, i being an integer ranging from 1 to n, the layer C1 being arranged between the layer A and the layer C2, the layer Cn being arranged between the layer B and the layer Cn−1, the layer Ci being arranged between the layer Ci−1 and the layer Ci+1 for values of i ranging from 2 to n−1 when n>2. Such a laminate has good resistance to separation of the layers which constitute it.

30 Claims, No Drawings

ELASTOMERIC LAMINATE COMPRISING MORE THAN THREE LAYERS

This application is a 371 national phase entry of PCT/EP2015/077351, filed on 23 Nov. 2015, which claims benefit of French Patent Application No. 1462227, filed 11 Dec. 2014, the entire contents of which are incorporated herein by reference for all purposes.

BACKGROUND

1. Technical Field

The present invention relates to elastomeric laminates comprising more than 3 layers of diene rubber composition, intended in particular to be used in a tire.

2. Related Art

A tire usually comprises a tread, two sidewalls, two beads, a carcass reinforcement passing into the two sidewalls and anchored to the two beads, and a crown reinforcement arranged circumferentially between the tread and the carcass reinforcement. The tread is intended to come into contact with the surface on which the tire runs. The tire may also comprise a tread underlayer, the underlayer being arranged circumferentially between the tread and the carcass reinforcement, preferably between the tread and the crown reinforcement, the tread underlayer being generally adjacent to the tread.

In the tire, the tread underlayer must adhere to the tread sufficiently in order to avoid the underlayer at the surface of the tread from detaching from the tread for the entire life of the tire. The underlayer generally adheres to the tread by means of physical or chemical phenomena, such as phenomena of interpenetration, entanglement or crosslinking of the diene rubber compositions constituting the tread and the tread underlayer, respectively.

Under the conditions suitable for processing and curing diene rubber compositions placed in contact with one another, these compositions are solidly bonded together and the complex obtained makes it possible to withstand the stresses associated with the field of application in question, especially that of tires.

The compositions which may be used in a tread may contain an elastomer matrix which has a low degree of unsaturation or which comprises a terpolymeric elastomer of ethylene, of an α-olefin and of a non-conjugated diene. An elastomer matrix is considered to have a low degree of unsaturation when it contains less than 10% by weight of diene units. Generally, the rubber composition of a tread underlayer is generally based on an elastomer matrix which comprises natural rubber, considered to be a highly unsaturated elastomer. However, the level of adhesion between, on the one hand, a first composition based on an elastomer matrix which has a low degree of unsaturation or which contains a terpolymeric elastomer of ethylene, of an α-olefin and of a non-conjugated diene, and, on the other hand, a second composition based on an elastomer matrix containing a highly unsaturated elastomer, may be deemed to be insufficient, especially for an application, in tires, of the first composition as tire tread and of the second composition as tread underlayer.

To overcome this, it is possible to use a material which will serve as bonding rubber or adhesive for bonding between the first composition and the second composition, especially used, respectively, as tire tread and tread underlayer. In this case, the tread underlayer is no longer adjacent over its entire length to the tread, but is separated therefrom by the bonding rubber.

SUMMARY

The Applicants have solved the problem by using a laminate which serves as bonding rubber between these two compositions. Used between the two compositions each constituting a layer to be adhesively bonded, it makes it possible to significantly improve the resistance to separation of the layers, especially by better adhesive bonding of each of the layers to be adhesively bonded.

Thus, a first subject of the invention is an elastomeric laminate comprising a layer A, a layer B, n layers Ci arranged between the layer A and the layer B, n being an integer greater than or equal to 2, i being an integer ranging from 1 to n, the layer C1 (i=1) being arranged between the layer A and the layer C2 (i=2),
the layer Cn (i=n) being arranged between the layer B and the layer Cn−1,
the layer Ci being arranged between the layer Ci−1 and the layer Ci+1 for values of i ranging from 2 to n−1 when n is greater than 2, in which the layer A consists of a diene rubber composition,
the layer B consists of a diene rubber composition comprising a diene elastomer B having a content by weight of diene units of greater than 50%,
the n layers Ci, for i ranging from 1 to n, each consist of a diene rubber composition,
the layer C1 comprises a diene elastomer E comprising ethylene units and diene units, the diene units representing more than 10% by weight of the monomer units of the diene elastomer E,
the layer Cn comprises from 50 to less than 100 phr of a diene elastomer N having a content by weight of diene units of greater than 50%,
the content, expressed in phr, of diene elastomer N being higher in the layer Cn than in the layer C1,
the content, expressed in phr, of diene elastomer E being higher in the layer C1 than in the layer Cn,
for n greater than 2, the layers Ci comprise a diene elastomer I selected from the group consisting of the diene homopolymers and copolymers having more than 10% by weight of diene units, for values of i ranging from 2 to n−1.

Another subject of the invention is the use of the elastomeric laminate.

The invention also relates to a tire which comprises the elastomeric laminate.

The invention also relates to an adhesive laminate which consists of the layers C1, Cn and Ci as defined in the elastomeric laminate, apart from the fact that the layer C1 and the layer Cn have a single interface with one layer, respectively with the layer C2 and the layer Cn−1, for i ranging from 2 to n−1 with n greater than or equal to 2.

The invention also relates to the use of an adhesive laminate for adhesively bonding two layers A' and B' of identical composition, respectively, to the layers A and B as defined in the elastomeric laminate, by applying the layer C1 to the layer A' and the layer Cn to the layer B'.

DETAILED DESCRIPTION OF

The expression composition "based on" should be understood as meaning a composition comprising the mixture and/or the reaction product of the various constituents used, some of these base constituents being capable of reacting, or intended to react, with one another, at least in part, during the various phases of manufacture of the composition, in particular during the crosslinking or vulcanization thereof.

The expression "part by weight per hundred parts by weight of elastomer" (or phr) should be understood as meaning, within the context of embodiments of the present invention, the portion by weight per hundred parts of elastomer present in the rubber composition in question and constituting a layer.

In the present description, unless expressly indicated otherwise, all the percentages (%) shown are percentages (%) by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

"Laminate" is intended to mean a product made of several layers, of planar or non-planar shape, in accordance with the definition given by the International Patent Classification.

The elastomeric laminate in accordance with embodiments of the invention comprises a layer A, a layer B, n layers Ci arranged between the layer A and the layer B, n being an integer greater than or equal to 2, i being an integer ranging from 1 to n, the layer C1 (i=1) being arranged between the layer A and the layer C2 (i=2),
the layer Cn being arranged between the layer B and the layer Cn−1,
the layer Ci being arranged between the layer Ci−1 and the layer Ci+1 for values of i ranging from 2 to n−1 when n is greater than 2, in which the layer A consists of a diene rubber composition,
the layer B consists of a diene rubber composition comprising a diene elastomer B having a content by weight of diene units of greater than 50%,
the n layers Ci, for i ranging from 1 to n, each consist of a diene rubber composition,
the layer C1 comprises a diene elastomer E comprising ethylene units and diene units, the diene units representing more than 10% by weight of the monomer units of the diene elastomer E,
the layer Cn comprises from 50 to less than 100 phr of a diene elastomer N having a content by weight of diene units of greater than 50%,
the content, expressed in phr, of diene elastomer N being higher in the layer Cn than in the layer C1,
the content, expressed in phr, of diene elastomer E being higher in the layer C1 than in the layer Cn,
for n greater than 2, the layers Ci comprise a diene elastomer I selected from the group consisting of the diene homopolymers and copolymers having more than 10% by weight of diene units, for values of i ranging from 2 to n−1.

The elastomeric laminate in accordance with embodiments of the invention is said to be elastomeric since it comprises several layers which consist of diene rubber compositions, in the case in point the layer A, the layer B, and the n layers.

The layers differ from their adjacent counterparts by their respective diene rubber composition, preferably by the nature of their elastomer matrix. "Adjacent counterparts" of the layer Ci is intended to mean the layers Ci+1 and Ci−1, for values of i ranging from 2 to n−1, the adjacent counterparts of the layer C1 being the layer A and the layer C2, the adjacent counterparts of the layer Cn being the layer Cn−1 and the layer B.

A "diene" elastomer (or "rubber", the two terms being considered to be synonymous) should be understood, in a known way, to mean an (one or more is understood) elastomer resulting at least in part (i.e., a homopolymer or a copolymer) from diene monomers (monomers bearing two carbon-carbon double bonds which may or may not be conjugated).

A highly unsaturated diene elastomer is an elastomer having a content by weight of diene units of greater than 50%.

A diene elastomer which has a low degree of unsaturation is an elastomer having a content by weight of diene units of less than 10%.

The content of diene units related to an elastomer is expressed as percentage by weight per 100 g of the elastomer. It is therefore a content by weight. For example, a content by weight of diene units of z % in an elastomer A means that the diene units represent z g in 100 g of elastomer A, z being a number from 0 to 100, for example equal to 5. This formulation is equivalent to saying that elastomer A contains z % of diene units, or that elastomer A exhibits z % of diene units, or else that elastomer A has z % of diene units.

A diene unit is a monomer unit originating from the insertion of a monomer subunit resulting from the polymerization of a conjugated diene monomer or of a non-conjugated diene monomer, the diene unit comprising a carbon-carbon double bond.

An elastomer matrix of a rubber composition is all the elastomers contained in the rubber composition.

A highly unsaturated elastomer matrix is an elastomer matrix having a content by weight of diene units of greater than 50%. A highly unsaturated elastomer matrix typically contains one (or several) highly unsaturated diene elastomers having a content by weight of diene units of greater than 50%. By way of example, mention may be made of the homopolymeric elastomers and copolymers of 1,3-diene, especially butadiene or isoprene.

An elastomer matrix which has a low degree of unsaturation is an elastomer matrix having a content by weight of diene units of less than 10%. An elastomer matrix which has a low degree of unsaturation typically contains one (or several) diene elastomers which have a low degree of unsaturation having a content of diene units of less than 10%. The elastomer matrix which has a low degree of unsaturation may nonetheless contain a highly unsaturated diene elastomer in a proportion such that the content of diene units present in the elastomer matrix is less than 10%.

The content of diene units related to an elastomer matrix is expressed as percentage by weight per 100 g of the elastomer matrix. It is therefore a content by weight. For example, a content by weight of diene units of z'% in an elastomer matrix B means that all the diene units present in elastomer matrix B represent z' g in 100 g of elastomer matrix B, z' being a number from 0 to 100, for example equal to 10. This formulation is equivalent to saying that elastomer matrix B contains z'% of diene units, or that elastomer matrix B has z'% of diene units.

Arrangement of the Layers:

The elastomeric laminate in accordance with embodiments of the invention has the essential feature of comprising a layer A, a layer B, and n layers Ci arranged between the layers A and B, n being an integer greater than or equal to 2, i being an integer ranging from 1 to n.

When the elastomeric laminate contains the layer A, the layer B and two layers both arranged between the layer A and the layer B, the layer C1 (i=1) is arranged between the layer A and the layer C2 (i=2), while the layer C2 is arranged between the layer C1 and the layer B. This variant corresponds to the case in which n is equal to 2.

When the elastomeric laminate in accordance with embodiments of the invention contains the layer A, the layer B, and more than two layers, especially n layers (n then being greater than 2) between the layer A and the layer B, each of the layers, referred to as Ci, is arranged between the layer Ci−1 and the layer Ci+1 for values of i ranging from 2 to n−1, knowing that the layer C1 has a common interface with the layer A and that the layer Cn has a common interface with the layer B. This variant corresponds to the case in which n is greater than 2.

The value of n is not limited by a maximum value from a technical viewpoint: it may vary to a large extent. Nonetheless, those skilled in the art will understand that a large number of layers Ci may not be favourable for certain applications, for example due to material costs and weight, which increase with the number of layers. This is why n is preferably equal to 2.

Composition of the Layers:

Layer C1

The elastomeric laminate also has the essential feature that the layer C1 comprises a diene elastomer E comprising ethylene units and diene units, the diene units representing more than 10% by weight of the monomer units of the diene elastomer E.

Elastomers comprising ethylene units and diene units are well known to those skilled in the art and may be synthesized by polymerization in the presence of Ziegler-Natta catalysts or catalytic systems comprising metallocenes. As diene elastomer E, mention may be made of copolymers of ethylene and of 1,3-diene, in particular butadiene or isoprene, terpolymers of ethylene, of α-olefin and of non-conjugated diene, especially EPDMs (ethylene-propylene-diene rubber).

It is understood that the diene elastomer E may be a mixture of elastomers corresponding to the definition of the diene elastomer E, especially mixtures of terpolymers of ethylene, of α-olefin and of non-conjugated diene which differ from one another in their macrostructure or their microstructure, in particular in the respective contents by weight of the ethylene, α-olefin and non-conjugated diene units.

According to a variant of the invention, the diene elastomer E is a terpolymer of ethylene, of α-olefin and of non-conjugated diene, the non-conjugated diene units representing more than 10% by weight of the second elastomer.

According to this variant, the diene elastomer E preferably has at least one, preferably all, of the following features:
  the ethylene units represent between 20 and 90%, preferentially between 30 and 70%, by weight of the diene elastomer E,
  the α-olefin units represent between 10 and 80%, preferentially from 15 to 70%, by weight of the diene elastomer E.

According to any one of the embodiments of this variant, the diene elastomer E preferentially contains between 10 and 40%, more preferentially between 10 and 20%, by weight of diene units. When the diene elastomer E has such a content of diene units, it is distinguished from the terpolymers of ethylene, of α-olefin and of non-conjugated diene which are conventionally used in rubber compositions for tires, especially in the sidewalls of tires for their age- and ozone-resistance, and which generally have a content of diene units of at most 10%.

According to a particular embodiment of the invention, the content of diene elastomer E is from 50 to 100 phr, preferably between 50 and 100 phr in the layer C1.

The layer C1 may also contain another diene elastomer, preferably having a content by weight of diene units of greater than 50%, in particular the diene elastomer N which is also present in the layer Cn, in which case the amount, calculated in phr, of diene elastomer N is lower in the layer C1 than in the layer Cn.

According to embodiments of the invention, the content, expressed in phr, of diene elastomer E in the layer C1 is such that it is always greater than that in the layer Cn. In other words, the amount, calculated in phr, of diene elastomer E is higher in the layer C1 than in the layer Cn.

According to a particularly preferential embodiment of the invention, the layer C1 contains more than 90 phr of a mixture of elastomers consisting of the diene elastomer N and the diene elastomer E, preferably 100 phr of this mixture.

Layer Cn

The elastomeric laminate also has the essential feature that the layer Cn comprises from 50 to less than 100 phr, preferably from 50 to 90 phr, of diene elastomer N having a content by weight of diene units of greater than 50%.

The diene elastomer N may be an elastomer containing conjugated diene monomer units, in particular 1,3-diene preferably containing 4 to 12 carbon atoms, advantageously isoprene.

It is understood that the diene elastomer N may be a mixture of elastomers which differ from one another in their macrostructure or their microstructure.

According to a preferential embodiment of the invention, the diene elastomer N is a polyisoprene with a high cis content, having a content of cis-1,4 bonding of greater than 90%, which percentage is calculated based on the weight of the polyisoprene.

According to any one of the embodiments of the invention, the diene elastomer is preferably natural rubber.

Aside from the diene elastomer N, the layer Cn contains another elastomer preferentially selected from the group consisting of diene elastomers having a content by weight of diene units of greater than 10%. This other diene elastomer is preferably the diene elastomer E, in which case the amount of diene elastomer E, calculated in phr, is lower in the layer Cn than in the layer C1.

According to a particularly preferential embodiment of the invention, the layer Cn contains more than 90 phr of a mixture of elastomers consisting of the diene elastomer N and the diene elastomer E, preferably 100 phr of this mixture.

When 2 layers are arranged between the layers A and B, as already mentioned above (n=2), the layer C2 contains the diene elastomer N and may contain the diene elastomer E, while the layer C1 contains the diene elastomer E and may contain the diene elastomer N.

Layers Ci for Values of i Ranging from 2 to n−1, n being Greater than 2:

When the laminate comprises more than 2 layers between the layers A and B (n being greater than 2), the layers Ci each, of course, comprise a diene elastomer I selected from the group consisting of the diene homopolymers and copolymers having more than 10% by weight of diene units, for values of i ranging from 2 to n−1. When n is equal to 3, the values taken by i ranging from 2 to n−1 are of course limited just to the value 2.

The diene elastomer I is preferably the diene elastomer E, the diene elastomer N or the mixture thereof.

When the diene elastomer I is the diene elastomer E, the content, expressed in phr, of diene elastomer E, is preferably lower in the layer Ci+1 than in the layer Ci for at least one of the values of i ranging from 2 to n−1. In other words, the composition of at least one of the layers Ci preferably has a lower content of diene elastomer E than the rubber composition constituting the layer which is considered to be its adjacent counterpart and which precedes it going in the direction from layer 1 to layer n, for values of i ranging from 2 to n−1.

According to a particularly preferential embodiment of the invention (n being greater than 2) the content, expressed in phr, of diene elastomer E, is lower in the layer Ci+1 than in the layer Ci for any value of i ranging from 2 to n−1. Since the layers are stacked on top of one another and given their respective concentration of diene elastomer E, those skilled in the art will understand that there is a gradient of content of diene elastomer E in the elastomeric laminate, this content decreasing in the direction from the layer 1 to the layer n, the content of diene elastomer E being expressed in phr in each of the layers.

According to one embodiment of the invention (n being greater than 2) the content, expressed in phr, of diene elastomer N, is lower in the layer Ci than in the layer Ci+1 for at least one of the values of i ranging from 2 to n−1. In other words, the composition of at least one of the layers Ci preferably has a lower content of diene elastomer E than the rubber composition constituting the layer which is considered to be its adjacent counterpart and which follows it going in the direction from layer 1 to layer n, for values of i ranging from 2 to n−1.

According to another particularly preferential embodiment of the invention (n being greater than 2) the content, expressed in phr, of diene elastomer N, is lower in the layer Ci than in the layer Ci+1 for any value of i ranging from 2 to n−1. Since the layers are stacked on top of one another, and given respective concentration of diene elastomer N, those skilled in the art will understand that there is a gradient of content of diene elastomer N in the elastomeric laminate, this content increasing in the direction from the layer 1 to the layer n, the content of diene elastomer N being expressed in phr in each of the layers.

A more preferential embodiment of the invention consists in combining the two particularly preferential embodiments described above, which leads to describing two gradients of diene elastomer content in the elastomeric laminate, one relative to the content of diene elastomer E and the other relative to the content of diene elastomer N, respectively decreasing and increasing in the elastomeric laminate in the direction from the layer 1 to the layer n.

According to a particularly preferential embodiment of the invention, any one, preferably all, of the layers Ci, for i ranging from 2 to n−1 (n being greater than 2), contains more than 90 phr of a mixture of elastomers consisting of the elastomer N and the elastomer E, preferably 100 phr of this mixture.

Layer B

The elastomeric laminate in accordance with embodiments of the invention has the essential feature of comprising a layer B, which layer B consists of a diene rubber composition comprising a diene elastomer B having a content by weight of diene units of greater than 50%.

It is understood that the diene elastomer B may be a mixture of elastomers which differ from one another in their macrostructure or their microstructure.

The diene elastomer B may be an elastomer containing conjugated diene monomer units, in particular 1,3-diene containing 4 to 12 carbon atoms, advantageously isoprene.

According to a preferential embodiment of the invention, the diene elastomer B is a polyisoprene with a high cis content, having a degree of 1,4-cis bonding of greater than 90%, preferably a natural rubber.

According to any one of the embodiments of the invention, the diene rubber composition of the layer B preferentially contains at least 95 phr, more preferentially 100 phr, of diene elastomer B.

Layer A

The elastomeric laminate in accordance with embodiments of the invention has the essential feature of comprising a layer A, which layer A consists of a diene rubber composition.

According to any one of the embodiments of the invention, the layer A preferably comprises a diene elastomer A which is a terpolymer of ethylene, of an α-olefin and of a non-conjugated diene having a content of diene units of less than 10% by weight.

According to a particular embodiment of the invention, the diene elastomer A has at least one, and preferably all, of the following features:
  the ethylene units represent between 20 and 90%, preferentially between 30 and 70%, by weight of the diene elastomer A,
  the α-olefin units represent between 10 and 80%, preferentially from 15 to 70%, by weight of the diene elastomer A,
  the non-conjugated diene units represent between 0.5 and 10% by weight of the diene elastomer A.

The content of elastomer A in the layer A is preferably at least 95 phr, more preferentially equal to 100 phr. These preferential ranges of values may apply to any one of the embodiments of the invention.

According to one embodiment of the invention, the elastomer matrix, which may be partially or entirely composed of the diene elastomer A and contained in the layer A, itself has a content by weight of diene units of less than 10%. This feature implies that the elastomer matrix has a relatively small amount of highly unsaturated elastomer and a relatively large amount of elastomer which has a low degree of unsaturation.

The α-olefin, the monomer units of which constitute the diene elastomer E or the diene elastomer A, may be a mixture of α-olefins. The α-olefin generally comprises from 3 to 16 carbon atoms. The following are for example suitable as α-olefin: propylene, 1-butene, 1-pentene, 1-hexene, 1-octene and 1-dodecene. Advantageously, the α-olefin is propylene, in which case the terpolymer is commonly referred to as an EPDM rubber.

The non-conjugated diene, the monomer units of which constitute the diene elastomer E or the diene elastomer A, generally comprises from 6 to 12 carbon atoms. Mention may be made, as non-conjugated diene, of dicyclopentadiene, 1,4-hexadiene, 5-ethylidene-2-norbornene, 5-methylene-2-norbornene or 1,5-cyclooctadiene. Advantageously, the non-conjugated diene is 5-ethylidene-2-norbornene.

According to any one of the embodiments of the invention, the diene elastomer E or the diene elastomer A is preferably an EPDM, more preferentially a terpolymer of ethylene, of propylene and of 5-ethylidene-2-norbornene.

According to any one of the embodiments of this variant, the diene elastomer E and the diene elastomer A are preferably an EPDM, more preferably a terpolymer of ethylene, of propylene and of 5-ethylidene-2-norbornene.

The microstructure of the elastomers is determined by $^1$H NMR analysis, supplemented by $^{13}$C NMR analysis when the resolution of the $^1$H NMR spectra does not enable the attribution and quantification of all the species. The measurements are carried out using a Bruker 500 MHz NMR spectrometer at frequencies of 500.43 MHz for observing protons and at 125.83 MHz for observing carbons.

For the measurements of mixtures or elastomers which are insoluble but which have the ability to swell in a solvent, an HRMAS z-grad 4 mm probe is used, making it possible to observe protons and carbons in proton-decoupled mode. The spectra are acquired at spin speeds of 4000 Hz to 5000 Hz.

For the measurements of soluble elastomers, a liquid NMR probe is used, making it possible to observe protons and carbons in proton-decoupled mode.

The insoluble samples are prepared in rotors filled with the analyte and a deuterated solvent enabling swelling, in general deuterated chloroform (CDCl$_3$). The solvent used must always be deuterated and its chemical nature may be adapted by those skilled in the art. The amounts of material used are adjusted so as to obtain spectra with sufficient sensitivity and resolution.

The soluble samples are dissolved in a deuterated solvent (approximately 25 mg of elastomer in 1 ml), in general deuterated chloroform (CDCl$_3$). The solvent or solvent blend used must always be deuterated and its chemical nature may be adapted by those skilled in the art.

In both cases (soluble sample or swollen sample):

For the proton NMR, a simple 30° pulse sequence is used. The spectral window is adjusted to observe all the resonance lines belonging to the molecules analysed. The accumulation number is adjusted in order to obtain a signal to noise ratio that is sufficient for the quantification of each unit. The recycle period between each pulse is adapted to obtain a quantitative measurement.

For the carbon NMR, a simple 30° pulse sequence is used with proton decoupling only during acquisition to avoid the "nuclear Overhauser" effects (NOE) and remain quantitative. The spectral window is adjusted to observe all the resonance lines belonging to the molecules analysed. The accumulation number is adjusted in order to obtain a signal to noise ratio that is sufficient for the quantification of each unit. The recycle period between each pulse is adapted to obtain a quantitative measurement.

The measurements are carried out at 25° C.

Reinforcing Filler:

The diene rubber composition constituting any one, preferably all, of the layers A, B and Ci, preferably comprises a reinforcing filler, in particular when the elastomeric laminate is used in a tire, i ranging from 1 to n with n greater than or equal to 2.

The reinforcing filler may be any type of "reinforcing" filler known for its abilities to reinforce a diene rubber composition which may be used for the manufacture of tires, for example an organic filler, such as carbon black, a reinforcing inorganic filler, such as silica, with which is combined, in a known way, a coupling agent, or else a mixture of these two types of fillers.

Such a reinforcing filler typically consists of nanoparticles, the (weight-)average size of which is less than a micrometre, generally less than 500 nm, usually between 20 and 200 nm, in particular and more preferentially between 20 and 150 nm.

All carbon blacks, especially the blacks conventionally used in tires or their treads ("tire-grade" blacks), are suitable as carbon blacks. Among the latter, mention will more particularly be made of the reinforcing carbon blacks of the series 100, 200, 300, or the blacks of the series 500, 600 or 700 (ASTM grades), such as for example the blacks N115, N134, N234, N326, N330, N339, N347, N375, N550, N683, N772. These carbon blacks can be used in the isolated state, as available commercially, or in any other form, for example as support for some of the rubber additives used.

"Reinforcing inorganic filler" should be understood here as meaning any inorganic or mineral filler, irrespective of its colour and its origin (natural or synthetic), also known as "white filler", "clear filler" or even "non-black filler", in contrast to carbon black, capable of reinforcing, by itself alone, without means other than an intermediate coupling agent, a diene rubber composition intended for the manufacture of pneumatic tires, in other words capable of replacing, in its reinforcing role, a conventional tire-grade carbon black; such a filler is generally characterized, in a known way, by the presence of hydroxyl (—OH) groups at its surface.

Mineral fillers of the siliceous type, preferentially silica (SiO$_2$), are suitable in particular as reinforcing inorganic fillers. The silica used can be any reinforcing silica known to those skilled in the art, especially any precipitated or fumed silica having a BET surface area and a CTAB specific surface area both of less than 450 m$^2$/g, preferably from 30 to 400 m$^2$/g, especially between 60 and 300 m$^2$/g. As highly dispersible precipitated silicas ("HDSs"), mention will be made, for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber and the silicas having a high specific surface area as described in application WO 03/016387.

In the present account, the BET specific surface area is determined in a known way by gas adsorption using the Brunauer-Emmett-Teller method described in *The Journal of the American Chemical Society*, Vol. 60, page 309, February 1938, more specifically, according to French Standard NF ISO 9277 of December 1996 (multipoint (5 point) volumetric method—gas: nitrogen—degassing: 1 hour at 160° C.—relative pressure p/po range: 0.05 to 0.17). The CTAB specific surface area is the external surface area determined according to French Standard NF T 45-007 of November 1987 (method B).

The physical state in which the reinforcing inorganic filler is provided is unimportant, whether it is in the form of a powder, microbeads, granules or else beads. Of course, reinforcing inorganic filler is also understood to mean mixtures of various reinforcing inorganic fillers, in particular of highly dispersible silicas as described above.

Those skilled in the art will understand that use might be made, as filler equivalent to the reinforcing inorganic filler described in the present paragraph, of a reinforcing filler of another nature, especially organic, such as carbon black, provided that this reinforcing filler is covered with an inorganic layer, such as silica, or else comprises, at its surface, functional sites, especially hydroxyl sites, requiring the use of a coupling agent in order to establish the bond between the filler and the elastomer. Mention may be made, by way of example, for example, of carbon blacks for tires, such as described, for example, in patent documents WO 96/37547 and WO 99/28380.

In order to couple the reinforcing inorganic filler to the diene elastomer, use is made, in a well-known way, of an at least bifunctional coupling agent, especially a silane, (or bonding agent) intended to provide a satisfactory connection, of chemical and/or physical nature, between the inorganic filler (surface of its particles) and the diene elastomer. Use is made in particular of at least bifunctional organosilanes or polyorganosiloxanes.

Use is especially made of silane polysulphides, referred to as "symmetrical" or "asymmetrical" depending on their specific structure, such as described, for example, in Applications WO 03/002648 (or US 2005/016651) and WO 03/002649 (or US 2005/016650).

Particularly suitable, without the definition below being limiting, are silane polysulphides corresponding to the general formula (V):

$$Z\text{-}A\text{-}S_x\text{-}A\text{-}Z \quad (V)$$

in which:
x is an integer from 2 to 8 (preferably from 2 to 5);
the A symbols, which are identical or different, represent a divalent hydrocarbon-based radical (preferably a $C_1$-$C_{18}$ alkylene group or a $C_6$-$C_{12}$ arylene group, more particularly a $C_1$-$C_{10}$, especially $C_1$-$C_4$, alkylene, in particular propylene);
the Z symbols, which are identical or different, correspond to one of the three formulae below:

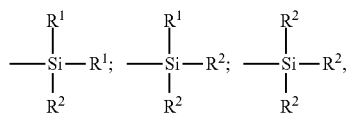

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, especially $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, even more preferentially a group chosen from $C_1$-$C_4$ alkoxyls, in particular methoxyl and ethoxyl).

In the case of a mixture of alkoxysilane polysulphides corresponding to the above formula (I), especially customary commercially available mixtures, the mean value of "x" is a fractional number preferably of between 2 and 5, more preferentially close to 4. However, embodiments of the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, of formula [$(C_2H_5O)_3Si(CH_2)_3S_2]_2$, or bis(triethoxysilylpropyl) disulphide, abbreviated to TESPD, of formula [$(C_2H_5O)_3Si(CH_2)_3S]_2$.

As coupling agent other than alkoxysilane polysulphide, mention will especially be made of bifunctional POSs (polyorganosiloxanes), or else of hydroxysilane polysulphides, such as described in patent applications WO 02/30939 (or U.S. Pat. No. 6,774,255) and WO 02/31041 (or US 2004/051210), or else of silanes or POSs bearing azodicarbonyl functional groups, such as described, for example, in patent applications WO 2006/125532, WO 2006/125533 and WO 2006/125534.

As coupling agent, mention may also be made of alkoxysilanes bearing an unsaturated carbon-based group capable of reacting, by the radical route, with a diene unit of the elastomer matrix. By way of example, mention may be made of 3-butene-triethoxysilane or 3-methacryloxypropyltrimethoxysilane.

The content of coupling agent is advantageously less than 20 phr (parts by weight per hundred parts of elastomer present in the rubber composition in question constituting one layer), it being understood that it is generally desirable to use as little as possible thereof. Typically, the content of coupling agent represents from 0.5% to 15% by weight relative to the amount of inorganic filler. Its content is preferentially between 0.5 and 12 phr, more preferentially within a range extending from 3 to 10 phr. This content is easily adjusted by those skilled in the art depending on the content of inorganic filler used in the diene rubber composition.

According to a particular embodiment of the invention, each of the diene rubber compositions constituting respectively the layers A and B and the n layers of the elastomeric laminate comprises a reinforcing filler.

Content of Reinforcing Filler:

The content of reinforcing filler in each of the diene rubber compositions of the elastomeric laminate may vary to a great extent, for example depending on the nature of the elastomer matrix or of the reinforcing filler in the diene rubber composition or depending on the amount of plasticizer in the diene rubber composition. These variables are adjusted by those skilled in the art as a function of the use made of the laminate, especially in a tire.

In the case of using the laminate in which the layer A of the laminate constitutes a tread intended to be fitted on a tire and the layer B constitutes a tread underlayer, the nature of the reinforcing filler in the diene rubber composition of the n layers, and also the content thereof, are chosen by those skilled in the art to be suitable for the particular conditions of this use. For example, the reinforcing filler may be a carbon black, a silica or a mixture thereof, the content thereof in the diene rubber composition being able to vary from 20 to 200 phr.

According to any one of the embodiments of the invention, the content of reinforcing filler in the diene rubber composition of the n layers preferably varies from 5 to 80 phr, more preferentially from 5 to 50 phr.

According to a particular embodiment of the invention, the diene rubber composition of the n layers comprises a content of reinforcing filler which is less than or equal to the content of reinforcing filler of the diene rubber composition of the layer A.

Other Additives:

The diene rubber composition constituting any one of the A and B and n layers of the elastomeric laminate may also contain, in addition to the coupling agents, coupling activators, agents for covering the inorganic fillers or more generally processing aids capable, in a known way, by virtue of an improvement in the dispersion of the filler in the rubber matrix and of a lowering of the viscosity of the diene rubber composition, of improving their ability to be processed in the uncured state.

It may also comprise all or a portion of the usual additives customarily used in elastomer compositions intended to constitute mixtures of rubber finished articles such as tires, such as, for example, pigments, protective agents, such as antiozone waxes, chemical antiozonants, antioxidants, antifatigue agents, a crosslinking system, vulcanization accelerators or retardants, or vulcanization activators. When the elastomer matrix contains a terpolymer of ethylene, of α-olefin and of non-conjugated diene, in particular an EPDM, it is possible to use crosslinking coagents customarily used in the crosslinking of EPDMs. As crosslinking coagent, mention may be made of triallyl isocyanurate, ethylene dimethacrylate, or trimethylolpropane trimethacrylate. The crosslinking system is preferably based on sulphur but it may also be based on sulphur donors, on peroxide, on bismaleimide or on mixtures thereof.

The diene rubber compositions which constitute respectively the layers A and B and n layers preferably comprise a crosslinking system, preferably a vulcanization system.

The diene rubber compositions which may be used for the purposes of embodiments of the invention may also comprise plasticizers, for example extending oils of aromatic or non-aromatic nature, especially very slightly aromatic or non-aromatic oils (e.g. paraffinic or hydrogenated naphthenic oils, or MES or TDAE oils), vegetable oils, in particular glycerol esters such as glycerol trioleates, hydrocarbon-based plasticizing resins having a high Tg, preferably of greater than 30° C., such as those described, for example, in applications WO 2005/087859, WO 2006/061064 and WO 2007/017060. The content of plasticizer is adjusted by those skilled in the art as a function of the viscosity and of the properties sought for the diene rubber composition, which are determined by the use which will be made of the diene rubber composition. The viscosity of the diene rubber composition itself depends on numerous variables, such as the viscosity of the elastomer matrix, the content of reinforcing filler, the interactions which may exist between the elastomer matrix and the reinforcing filler. Thus, those skilled in the art, with their general knowledge, choose the suitable content of plasticizer while taking these different variables into account.

If the diene rubber compositions constituting the n layers which may be used for the purposes of embodiments of the invention contain a plasticizer, they preferably contain at most 20 phr, more preferentially less than 10 phr, even more preferentially less than 5 phr, thereof. These preferential embodiments make it possible to achieve very noteworthy levels of adhesion between the layers.

According to another embodiment of the invention, the diene rubber composition of any one, preferably all, of the n layers does not contain plasticizer. This embodiment which is advantageous from the point of view of adhesion performance is particularly suited to the diene rubber compositions constituting the n layers which have a low content of filler, especially those which comprise at most 50 phr of reinforcing filler.

Preparation of the Diene Rubber Compositions:

The diene rubber compositions which may be used for the purposes of embodiments of the invention are manufactured in appropriate mixers, using two successive phases of preparation well known to those skilled in the art: a first phase of thermomechanical working or kneading ("non-productive" phase) at high temperature, up to a maximum temperature of between 130° C. and 200° C., followed by a second phase of mechanical working ("productive" phase) down to a lower temperature, typically below 110° C., for example between 40° C. and 100° C., during which finishing phase the crosslinking system is incorporated.

Preparation of the Laminate:

In the manufacture of the elastomeric laminate in accordance with embodiments of the invention, the diene rubber compositions constituting the layers are affixed to one another in the uncured state. In order to facilitate interfacial adhesion, the layers are preferably applied under hot conditions, the layers being in the uncured state. The application of the layers in the uncured state under hot conditions is carried out at a temperature which is compatible with the chemical nature of the layers, that is to say at a temperature which does not, for example, cause the premature crosslinking of the layers. Typically, a temperature greater than room temperature (20° C.) and not exceeding 80° C. is most appropriate.

It will be readily understood that, depending on the specific fields of application, the elastomeric laminate in accordance with embodiments of the invention may comprise several preferential thickness ranges. Thus, for example, for pneumatic tires of passenger vehicle type, the layers A and B may have a thickness of at least 2 mm, preferentially of between 3 and 10 mm. According to another example, for pneumatic tires of heavy-goods or agricultural vehicles, the preferential thickness can be between 2 and 20 mm for the layers A and B. According to another example, for pneumatic tires of vehicles in the field of civil engineering or for aeroplanes, the preferential thickness of the layers A and B can be between 2 and 100 mm.

According to the particular conditions of use of the elastomeric laminate, the n layers may each have a thickness ranging from 60 μm to a few millimetres, for example from 100 μm to 5 mm.

For the smallest thicknesses, in particular of the order of a few hundred μm, the layers are preferably formed by applying the diene rubber composition in the form of a solution composed of a volume of solvent. For greater thicknesses, preference is given to calendering or even extruding the diene rubber composition in the form of a layer.

In order to manufacture the elastomeric laminate, the layers may be arranged on top of one another by successive application of the layers, for example on a building drum conventionally used in the manufacture of pneumatic tires (or tire casings). For example, the layer A is placed on the drum, the layer C1 on the layer A and so on, until the application of the layer B on the layer Cn.

The elastomeric laminate may either be in the uncured state (before crosslinking or vulcanization) or in the cured state (after crosslinking or vulcanization).

In the manufacture of a tire containing the elastomeric laminate, the elastomeric laminate may be manufactured prior to the manufacture of the tire or during the manufacture of the tire. In the former case, the elastomeric laminate formed beforehand may be applied to the tire by placing it for example on the carcass reinforcement or the crown reinforcement of the tire. In the second case, the layer B can be placed, for example, on the carcass reinforcement or the crown reinforcement of the tire, then the layer Cn on the layer B, and so on, until the application of the layer A on the layer C1.

The elastomeric laminate may be used in a tire, the tire comprising a tread, two sidewalls, two beads, a carcass reinforcement passing into the two sidewalls and anchored to the two beads, and a crown reinforcement arranged circumferentially between the tread and the carcass reinforcement.

According to one embodiment of the invention, the elastomeric laminate is used in a tire such that the layer A constitutes a portion or all of the tire tread and the layer B constitutes a portion or all of a tread underlayer.

According to a preferential embodiment of the invention in which the elastomeric laminate is used in a tire, the layer A constitutes all of the tread and the layer B constitutes all of a tread underlayer.

When the layer B in the elastomeric laminate is used as a tire tread underlayer, it is preferably not intended to come into contact with the surface on which the tire runs.

The tire, which is provided with the elastomeric laminate and which represents another subject of the invention, may be in the cured or uncured state.

The other subject, the adhesive laminate, consists of the layers C1, Cn and Ci as defined in the elastomeric laminate in accordance with embodiments of the invention, apart from the fact that the layer C1 and the layer Cn have a single interface with one layer, respectively with the layer C2 and the layer Cn−1, for i ranging from 2 to n−1 with n greater than or equal to 2. It may be used as a bonding rubber for adhesively bonding two layers A' and B' of identical composition, respectively, to the layers A and B and thereby forming, with the layers A' and B', the elastomeric laminate in accordance with embodiments of the invention. The adhesive laminate in the uncured state is arranged between the layers A' and B', also in the uncured state, to form the elastomeric laminate in accordance with embodiments of the invention, by applying the layer C1 to the layer A' and the layer Cn to the layer B'.

The abovementioned features of embodiments of the present invention, and also others, will be better understood on reading the following description of several exemplary embodiments of the invention, given by way of nonlimiting illustration.

Exemplary Embodiments

1—Preparation of the Diene Rubber Compositions and Laminates

The following procedure is used for the compositions, the formulation of which is shown in Table I:

The elastomer, the reinforcing filler and also the various other ingredients, with the exception of the vulcanization system, are successively introduced into an internal mixer (final degree of filling: approximately 70% by volume), the initial vessel temperature of which is approximately 80° C. Thermomechanical working (non-productive phase) is then carried out in one step, which lasts in total approximately 3 to 4 min, until a maximum "dropping" temperature of 165° C. is reached. The mixture thus obtained is recovered and cooled and then sulphur and an accelerator of sulphenamide type are incorporated on a mixer (homofinisher) at 30° C., everything being mixed (productive phase) for an appropriate time (for example approximately ten minutes).

The compositions thus obtained are subsequently calendered in the form of slabs (thickness of 2 to 3 mm) or layers for the measurement of their respective levels of adhesion.

The compositions A, B, C1 and C2 differ by the nature of the elastomer matrix which respectively composes them, and they respectively constitute the layers A, B, C1 and C2. The layer C1 is arranged between the layer A and C2; the layer C2 between the layer C1 and the layer B.

The layer A comprises an EPDM elastomer which has a low degree of unsaturation, with 5% by weight of diene units; the layer B comprises an elastomer having more than 50% by weight of diene units, natural rubber.

The elastomer matrix of the layer C1 and that of the layer C2 respectively comprise an EPDM elastomer with 14% by weight of diene units and natural rubber, an elastomer having more than 50% by weight of diene units, knowing that the content of EPDM elastomer with 14% by weight of diene units is higher in the layer C1 than in the layer C2 and that the content of natural rubber is higher in the layer C2 than in the layer C1, the contents of the elastomers being expressed in phr.

2—Measurements and Tests Used

Adhesion is measured by a T-type peel test, also referred to as 180° peeling. The peeling test specimens are produced by bringing the two layers (the compositions constituting the layers being in the uncured state) for which the adhesion is to be tested into contact. An incipient crack is inserted between the two layers. Each of the layers is reinforced by a composite ply which limits the deformation of said layers under traction.

The test specimen, once assembled, is brought to 150° C. under a pressure of 16 bar, for 30 minutes. Strips with a width of 30 mm are then cut out using a cutting machine. The two sides of the incipient crack were subsequently placed in the jaws of a tensile testing device with the Instron brand name. The tests are carried out at 20° C. and at a pull speed of 100 mm/min. The tensile stresses are recorded and the latter are standardized by the width of the test specimen. A curve of strength per unit width (in N/mm) as a function of the movable crosshead displacement of the tensile testing machine (between 0 and 200 mm) is obtained. The adhesion value selected corresponds to the propagation of the crack within the test specimen and thus to the mean stabilized value of the curve. The adhesion values of the examples are standardized relative to a control (base 100).

The adhesion is measured between the two layers A and B, between the two layers C1 and C2, between the two layers A and C1 and between the two layers B and C2. The value for the measurement of adhesion between the two layers A and B is selected as the control value, since a laminate comprising the two layers A and B, the layer A being arranged on the layer B, is not in accordance with embodiments of the invention.

Table 2 presents the results obtained after peel tests at room temperature. The results are expressed as performance index. An index of greater than 100 indicates a greater improvement in adhesion.

It is observed that the performance indices of adhesion between the layer B and the layer C2, between the layer A and the layer C1 and between the layer C1 and the layer C2, are the highest (475, 570 and 500, respectively) relative to the control. The presence of the layers C1 and C2 in a laminate comprising the layers A and B, the layers C1 and C2 being arranged between the layer A and the layer C2 and between the layer C1 and the layer B of the laminate, makes it possible to very greatly increase the resistance of the laminate to the separation of the layers which constitute it, compared to the control laminate only comprising the layers A and B.

TABLE 1

|  | A | B | C1 | C2 |
|---|---|---|---|---|
| NR (1) | — | 100 | 10 | 70 |
| EPDM (2) | 100 | — | — | — |
| EPDM (3) | — | — | 90 | 30 |

TABLE 1-continued

|  | A | B | C1 | C2 |
|---|---|---|---|---|
| Carbon black (4) | 30 | 30 | 30 | 30 |
| Antioxidant (5) | 1.5 | 1.5 | 1.5 | 1.5 |
| Stearic acid (6) | 2.5 | 2.5 | 2.5 | 2.5 |
| Zinc oxide (7) | 3 | 3 | 3 | 3 |
| Accelerator (8) | 2.0 | 2.0 | 2.0 | 2.0 |
| Sulphur | 1.0 | 1.0 | 1.0 | 1.0 |

(1) Natural rubber
(2) EPDM, Nordel IP 4570 from Dow
(3) EPDM, 9090M from Mitsui
(4) Carbon black of N234 grade according to Standard ASTM D-1765
(5) N-(1,3-Dinnethylbutyl)-N-phenyl-para-phenylenediamine, Santoflex 6-PPD from Flexsys
(6) Stearin, Pristerene 4931 from Unicienna
(7) Zinc oxide of industrial grade from Umicore
(8) N-Cyclohexyl-2-benzothiazolesulphenamide, Santocure CBS from Flexsys

| Interface between layers tested | A/B | B/C2 | A/C1 | C1/C2 |
|---|---|---|---|---|
| Level of adhesion | 100 | 475 | 570 | 500 |

The invention claimed is:

1. An elastomeric laminate comprising: a layer A, a layer B, n layers Ci arranged between the layer A and the layer B, n being an integer greater than or equal to 2, i being an integer ranging from 1 to n,
   a layer C1 being arranged between the layer A and a layer C2,
   a layer Cn being arranged between the layer B and a layer Cn−1,
   the layer Ci being arranged between a layer Ci−1 and a layer Ci+1 for values of i ranging from 2 to n−1 when n is greater than 2,
in which
   the layer A consists of a diene rubber composition,
   the layer B consists of a diene rubber composition comprising a diene elastomer B having a content by weight of diene units of greater than 50%,
   the n layers Ci, for i ranging from 1 to n, each consist of a diene rubber composition,
   the layer C1 comprises a diene elastomer E comprising ethylene units and diene units, the diene units representing more than 10% by weight of the monomer units of the diene elastomer E,
   the layer Cn comprises from 50 to less than 100 phr of a diene elastomer N having a content by weight of diene units of greater than 50%,
   a content, expressed in phr, of diene elastomer N being higher in the layer Cn than in the layer C1,
   a content, expressed in phr, of diene elastomer E being higher in the layer C1 than in the layer Cn,
   for n greater than 2, the layers Ci comprise a diene elastomer I selected from the group consisting of the diene homopolymers and copolymers having more than 10% by weight of diene units, for values of i ranging from 2 to n−1.

2. An elastomeric laminate according to claim 1, in which the diene elastomer N is a polyisoprene with a cis content, having a degree of 1,4-cis bonding of greater than 90%.

3. An elastomeric laminate according to claim 1, in which the diene elastomer I is the diene elastomer E, the diene elastomer N or the mixture thereof.

4. An elastomeric laminate according to claim 3, in which the content, expressed in phr, of diene elastomer E, is lower in the layer Ci+1 than in the layer Ci for at least one of the values of i ranging from 2 to n−1, with n greater than 2.

5. An elastomeric laminate according to claim 3, in which the content, expressed in phr, of diene elastomer E, is lower in the layer Ci+1 than in the layer Ci for any value of i ranging from 2 to n−1, with n greater than 2.

6. An elastomeric laminate according to claim 3, in which the content, expressed in phr, of diene elastomer N, is lower in the layer Ci than in the layer Ci+1 for at least one of the values of i ranging from 2 to n−1, with n greater than 2.

7. An elastomeric laminate according to claim 3, in which the content, expressed in phr, of diene elastomer N, is lower in the layer Ci than in the layer Ci+1 for any value of i ranging from 2 to n−1, with n greater than 2.

8. An elastomeric laminate according to claim 1, in which any one of the layers Ci contains more than 90 phr of a mixture of elastomers consisting of the elastomer N and the elastomer E for i ranging from 2 to n−1, with n greater than 2.

9. An elastomeric laminate according to claim 1, in which the layer Cn comprises another elastomer.

10. An elastomeric laminate according to claim 1, in which the layer Cn contains more than 90 phr of a mixture of elastomers consisting of the diene elastomer N and the diene elastomer E.

11. An elastomeric laminate according to claim 1, in which the layer C1 comprises another diene elastomer.

12. An elastomeric laminate according to claim 1, in which the content of diene elastomer E is from 50 to 100 phr in the layer C1.

13. An elastomeric laminate according to claim 1, in which the layer C1 contains more than 90 phr of a mixture of elastomers consisting of the diene elastomer N and the diene elastomer E.

14. An elastomeric laminate according to claim 1, in which the content, expressed in phr, of diene elastomer N is from 50 to 90 phr in the layer Cn.

15. An elastomeric laminate according to claim 1, in which the diene elastomer E contains between 10 and 40% by weight of diene units.

16. An elastomeric laminate according to claim 1, in which the diene elastomer E is a terpolymer of ethylene, of an α-olefin and of a non-conjugated diene.

17. An elastomeric laminate according to claim 1, in which a content of diene elastomer B in the diene rubber composition of the layer B is at least 95 phr.

18. An elastomeric laminate according to claim 1, in which the diene elastomer B is a polyisoprene with a high cis content, having a degree of 1,4-cis bonding of greater than 90%.

19. An elastomeric laminate according to claim 1, in which the layer A comprises a diene elastomer A which is a terpolymer of ethylene, of an α-olefin and of a non-conjugated diene having a content of diene units of less than 10% by weight.

20. An elastomeric laminate according to claim 1, in which the layer A contains an elastomer matrix A having a content by weight of diene units of less than 10%.

21. An elastomeric laminate according to claim 1, in which a content of diene elastomer A in the layer A is at least 95 phr.

22. An elastomeric laminate according to claim 1, in which any one of the layers A, B and Ci comprises a reinforcing filler, i varying from 1 to n.

23. An elastomeric laminate according to claim 1, in which any one of the layers A, B and Ci comprises a crosslinking system, i varying from 1 to n.

24. An elastomeric laminate according to claim 1, in which each of the n layers contains at most 20 phr of a plasticizer.

25. An elastomeric laminate according to claim 1, in which any one of the n layers does not contain plasticizer.

26. An elastomeric laminate according to claim 1, in which n is equal to 2.

27. A tire comprising an elastomeric laminate defined according to claim 1.

28. A tire comprising a tread, two sidewalls, two beads, a carcass reinforcement passing into the two sidewalls and anchored to the two beads, and a crown reinforcement arranged circumferentially between the tread and the carcass reinforcement, which tire comprises an elastomeric laminate according to claim 1.

29. A tire according to claim 28, in which the layer A of the elastomeric laminate constitutes a portion or all of the tire tread and the layer B of the elastomeric laminate constitutes a portion or all of a tread underlayer.

30. An adhesive laminate which consists of n layer(s) $C_i$, a layer $C_1$, and a layer $C_n$,
- n being an integer greater than or equal to 2,
- i being an integer ranging from 1 to n,
- the layer $C_1$ comprising a diene elastomer E comprising ethylene units and diene units,
- the layer $C_n$ comprising from 50 to less than 100 phr of a diene elastomer N having a content by weight of diene units of greater than 50%,
- a content, expressed in phr, of the diene elastomer N being higher in the layer $C_n$ than in the layer $C_1$,
- a content, expressed in phr, of the diene elastomer E being higher in the layer $C_1$ than in the layer $C_n$,
- each $C_i$ layer consisting of a diene rubber composition, and
- wherein the layer $C_1$ and the layer $C_n$ have a single interface respectively with the layer $C_2$ and a layer $C_{n-1}$, for i ranging from 2 to n−1 with n greater than or equal to 2.

* * * * *